(12) United States Patent
Lebert (10) Patent No.: US 9,146,718 B2
(45) Date of Patent: Sep. 29, 2015

(54) RE-FACTOR CODE TO USE METHOD CHAINING WITH OPTIMIZER TOOL

(71) Applicant: International Business Machines Corporation, Armonk, NY (US)

(72) Inventor: Berthold M. Lebert, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/964,067

(22) Filed: Aug. 10, 2013

(65) Prior Publication Data

US 2015/0046911 A1   Feb. 12, 2015

(51) Int. Cl.
G06F 9/45   (2006.01)

(52) U.S. Cl.
CPC .............. *G06F 8/443* (2013.01); *G06F 8/4441* (2013.01)

(58) Field of Classification Search
None
See application file for complete search history.

(56) References Cited

U.S. PATENT DOCUMENTS

| | | | | |
|---|---|---|---|---|
| 5,469,572 A * | 11/1995 | Taylor | ........................... | 717/152 |
| 7,272,829 B1 | 9/2007 | Meirowitz | | |
| 2002/0038454 A1 | 3/2002 | Trux | | |
| 2002/0147970 A1 * | 10/2002 | Smith et al. | .................... | 717/140 |
| 2012/0331484 A1 | 12/2012 | Vickers | | |
| 2013/0167126 A1 * | 6/2013 | Iyer et al. | ...................... | 717/140 |

FOREIGN PATENT DOCUMENTS

WO   9828683 A1   7/1998

OTHER PUBLICATIONS

Xu, Hao; "EriLex: An Embedded Domain Specific Language Generator", 48th International Conference TOOLS 2010, Jun. 28-Jul. 2, 2010, pp. 192-212.*
Waalar, Eivind; "Embedding Efficient DSLs on the JVM", University of Oslo Department of Informatics, May 2, 2010, pp. 1 and 29-30.*
Xu, H.; "EriLex: an embedded domain specific language generator"; Object, Models, Components, Patterns, Proceedings 49th International Conference, TOOLS 2010, pp. 192-212, 2010.
Kranz, D. et al.; "ORBIT: An Optimizing Compiler for Scheme"; An IP.com Prior Art Database Technical Disclosure; http://ip.com/IPCOM/000128722D; Sep. 16, 2005.
Young, RP. et al.; "The Coder: A Program Module for Code Generation in High-Level Language Compilers"; An IP.com Prior Art Database Technical Disclosure; http://ip.com/IPCOM/000151684D; Apr. 23, 2007.

* cited by examiner

*Primary Examiner* — Chameli Das
*Assistant Examiner* — Joanne Macasiano
(74) *Attorney, Agent, or Firm* — Anthony V. S. Englan; Prentiss W. Johnson (57) ABSTRACT

Optimizing compiled code includes finding a portion of the compiled code arising from method calls in a portion of source code that were not chained method calls. Modified code is produced for the portion of the compiled code, wherein the modified code conforms to compiled code that would have arisen from source code having chained calls equivalent to the method calls that were not chained in the portion of the source code.

20 Claims, 5 Drawing Sheets

RE-FACTOR CODE TO USE METHOD CHAINING WITH OPTIMIZER TOOL

BACKGROUND

On some computer platforms, memory usage must be kept to a minimum, particularly on embedded and mobile device platforms. Small differences in memory requirements may make a huge difference in cost savings in relation to the cost of the device. Also shorter code often executes faster.

SUMMARY

According to an embodiment of the invention, a method for optimizing compiled code includes finding a portion of the compiled code arising from method calls in a portion of source code that were not chained method calls and producing modified code for the portion of the compiled code. The modified code conforms to compiled code that would have arisen from source code having chained calls equivalent to the method calls that were not chained in the portion of the source code.

In another aspect, finding the portion of the compiled code includes finding compiled code arising from the portion of the source code in which a first call to a first method in a receiving object returns the receiving object and immediately precedes a next call to the same object for a next method.

In another aspect, finding the portion of the compiled code includes finding compiled code arising from the portion of the source code in which a first call to a first method returns an object and immediately precedes a next call to the same object for a next method.

In another aspect, finding the portion of the compiled code includes finding compiled code arising from the portion of the source code in which a first call to a first method does not return an object and immediately precedes a next call to a next method.

In another aspect, finding the portion of the compiled code includes finding compiled code arising from the portion of the source code having a first call to a first method immediately preceding a next call to a next method and for which chaining of the first and next method calls would produce compiler error. Producing modified code for the portion of the compiled code includes producing modified code conforming to compiled code that would have arisen from source code having a different setter method than would compile to produce the modified code for the first call and next call.

In another aspect, producing modified code for the portion of the compiled code includes producing modified code for the portion of the compiled code responsive to determining that performance savings achieved by the method chaining via the different setter method outweighs performance cost of where method chaining cannot be applied in spite of the different setter method.

In another aspect, producing modified code for the portion of the compiled code includes deleting lines of the portion of the compiled code.

Other embodiments of the invention are disclosed and claimed, including a computer system implementation and a program product implementation.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

One way to reduce memory usage and to improve the performance is to use a method chaining technique, which is supported by some programming languages, including Java. Method chaining may yield shorter source code and, on some platforms, shorter compiled code (e.g. Java byte code), which is also faster to execute.

The following examples using the Java programming language illustrate a process performed by a software tool, according to embodiments of the present invention, which includes searching classes of compiled Java code for places where method chaining may be employed and transforming the code. The following examples illustrate method chaining improvements in terms of source code, although automated processes disclosed herein re-factor compiled code to achieve method chaining, which does not alter source code.

Code AA, BB, CC and DD below, illustrate the application of method chaining, according to embodiments of the present invention, where a method is called that returns the receiving object itself. Then, code EE and FF below illustrate, according to embodiments of the present invention, that method chaining may also be applied when an object returned by the first called method is merely the same object that receives the next method call, regardless of whether the returned object is the object that received the first method call.

As previously noted, method chaining is achieved in all these examples via modifying byte-code, rather than source code, which is useful since recompiling may not be possible, particularly if the original source code is not available. It may be still further advantageous to achieve method chaining via modifying byte-code in instances where a compiler may return an error if the method chaining is achieved by modifying and compiling source code. Dimension class source code and code HH and GG below illustrate this, according to embodiments of the present invention.

In the following example, a Java method is illustrated that creates a java.lang.StringBuilder object and appends data to it to construct a string object. This can be done with method calls one-by-one, as in the following source code ("source code AA"):

```
public String toString(String string, int integer, char character) {
    StringBuilder sb = new StringBuilder( );
    sb.append("string=");
    sb.append(string);
    sb.append(" integer=");
    sb.append(integer);
    sb.append(" char=");
```

```
        sb.append(character);
        return sb.toString( );
    }
```

Alternatively, this can be done with method chaining, as in the following source code ("source code BB"):

```
public String toString(String string, int integer, char character) {
    return new StringBuilder( ).append("string=").append(string)
        .append(" integer=").append(integer)
        .append(" char=").append(character)
        .toString( );
}
```

Byte code produced by a Java compiler for source code AA and BB does the same thing, but is not identical. For source code AA, the Java compiler generates compiled byte code as follows:

```
public java.lang.String toString(java.lang.String string, int integer, char character);
    0 new java.lang.StringBuilder
    3 dup
    4 invokespecial java.lang.StringBuilder( )
    7 astore 4 [sb]
    9 aload 4 [sb]
    11 ldc <String "string=">
    13 invokevirtual java.lang.StringBuilder.append(java.lang.String)
    16 pop
    17 aload 4 [sb]
    19 aload_1 [string]
    20 invokevirtual java.lang.StringBuilder.append(java.lang.String)
    23 pop
    24 aload 4 [sb]
    26 ldc <String " integer=">
    28 invokevirtual java.lang.StringBuilder.append(java.lang.String)
    31 pop
    32 aload 4 [sb]
    34 iload_2 [integer]
    35 invokevirtual java.lang.StringBuilder.append(int)
    38 pop
    39 aload 4 [sb]
    41 ldc <String " char=">
    43 invokevirtual java.lang.StringBuilder.append(java.lang.String)
    46 pop
    47 aload 4 [sb]
    49 iload_3 [character]
    50 invokevirtual java.lang.StringBuilder.append(char)
    53 pop
    54 aload 4 [sb]
    56 invokevirtual java.lang.StringBuilder.toString( )
    59 areturn
```

For source code BB, which uses the method chaining technique, the Java compiler generates compiled byte code as shown above, but omitting lines 7, 9, 16, 17, 23, 24, 31, 32, 38, 39, 46, 47, 53, and 54. In this example, the compiled byte code from source code BB is 14 instructions shorter. In terms of bytes, it is 22 bytes shorter, which is a reduction of 37%.

Next, a StringBuffer example is presented as a second example. First, here is source code that includes method calls one-by-one ("source code CC"):

```
public String toString( ) {
    StringBuffer sb = new StringBuffer( );
    sb.append("country=");
    String country = Locale.getDefault( ).getCountry( );
    sb.append(country);
    sb.append(" time=");
```

```
    long time = System.currentTimeMillis( );
    sb.append(time);
    return sb.toString( );
}
```

Next, here is source code that provides method chaining, which includes local variable in-lining ("source code DD"):

```
public String toString( ) {
    return new StringBuffer( )
        .append("country=")
        .append(Locale.getDefault( ).getCountry( ))
        .append(" time=")
        .append(System.currentTimeMillis( ))
        .toString( );
}
```

For source code CC, the Java compiler generates compiled byte code as follows:

```
public java.lang.String toString( );
    0 new java.lang.StringBuffer
    3 dup
    4 invokespecial java.lang.StringBuffer( )
    7 astore_1 [sb]
    8 aload_1 [sb]
    9 ldc <String "country=">
    11 invokevirtual java.lang.StringBuffer.append(java.lang.String)
    14 pop
    15 invokestatic java.util.Locale.getDefault( )
    18 invokevirtual java.util.Locale.getCountry( )
    21 astore_2 [country]
    22 aload_1 [sb]
    23 aload_2 [country]
    24 invokevirtual java.lang.StringBuffer.append(java.lang.String)
    27 pop
    28 aload_1 [sb]
    29 ldc <String " time=">
    31 invokevirtual java.lang.StringBuffer.append(java.lang.String)
    34 pop
    35 invokestatic java.lang.System.currentTimeMillis( )
    38 lstore_3 [time]
    39 aload_1 [sb]
    40 lload_3 [time]
    41 invokevirtual java.lang.StringBuffer.append(long)
    44 pop
    45 aload_1 [sb]
    46 invokevirtual java.lang.StringBuffer.toString( )
    49 areturn
```

For source code DD, the Java compiler generates compiled byte code as shown above, but omitting the bold lines, i.e., lines 7, 8, 14, 21 through 23, 27, 28, 34, 38 through 40, 44 and 45. In this example, the compiled byte code from source code DD is 14 instructions shorter. In terms of bytes, it is 14 bytes shorter, which is a reduction of 30%.

In one of the above examples, the StringBuilder object receives repeated requests via source code AA to perform an append method. According to Java specifications of the StringBuilder class, the append method of the StringBuilder class returns the StringBuilder object, itself. Thus, source code AA and the StringBuilder object herein above illustrates an instance of a method, i.e., the append method, of a receiving object, i.e., StringBuilder, that is called in source code AA, where the method returns the receiving object itself, i.e., StringBuilder, and then once again receives the next method call in source code AA.

In another of the examples above, the StringBuffer object, likewise, receives repeated requests via source code CC to perform an append method. According to Java specifications of the StringBuffer class, the append method of the StringBuffer class returns the StringBuffer object, itself. This, likewise, illustrates an instance of a method, i.e., the append method, of a receiving object, i.e., StringBuffer, that returns the receiving object itself, i.e., StringBuffer, and then receives the next method call in source code CC.

The present disclosure involves a recognition that method chaining is facilitated by the pattern of the above examples, i.e., the pattern wherein a first method call and a next method call are both to the same object and wherein the object returned by the first called method is the receiving object. The present disclosure also involves a further recognition that method chaining is not limited only to a method that returns a receiving object and is then immediately invoked again, as in the above examples. Method chaining may also be applied where an object returned by the first called method is, more generally, the same object that receives the next method call, regardless of whether the returned object is the object that received the first method call.

For example, according to Java specifications of the Locale class, the getDefault method returns the current, default locale value and the getCountry method returns a country code for the locale. Herein below is source code that includes method calls one-by-one ("source code EE"), wherein there is a first method call to the getDefault method of the Locale class, which returns the current, default locale object, and then the locale object receives a next call to the getCountry method:

```
public String getCountry( ) {
    Locale locale = Locale.getDefault( );
    String country = locale.getCountry( );
    return country.toLowerCase( );
}
```

In contrast, here is source code that uses method chaining ("source code FF"):

```
public String getCountry( ) {
    return Locale.getDefault( ).getCountry( ).toLowerCase( );
}
```

For source code EE, the Java compiler generates compiled byte code as follows:

```
public java.lang.String getCountry( );
    0 invokestatic java.util.Locale.getDefault( )
    3 astore_1 [locale]
    4 aload_1 [locale]
    5 invokevirtual java.util.Locale.getCountry( )
    8 astore_2 [country]
    9 aload_2 [country]
    10 invokevirtual java.lang.String.toLowerCase( )
    13 a return
```

For source code FF, the Java compiler generates compiled byte code as shown above, but omitting the bold lines, i.e., lines 3, 4, 8 and 9. This illustrates the applicability of method chaining where an object, i.e., the locale object, returned by the first called method, i.e., the getDefault method, is the same object that receives the next method call, i.e., the getCountry method, but the first method call does not return the object that receives the first method call.

According to embodiments of the present invention, method chaining may also be applied in cases where methods do not return any object at all, i.e., so-called "void" methods.

Consider this example "dimension class" source code (the "Dimension Class source code"):

```
public class Dimension {
    private int x,y,z;
    public int getX( ) {
        return x;
    }
    public void setX(int x) {
        this.x = x;
    }
    public int getY( ) {
        return y;
    }
    public void setY(int y) {
        this.y = y;
    }
    public int getZ( ) {
        return z;
    }
    public void setZ(int z) {
        this.z = z;
    }
}
```

The following source code ("source code GG") uses this Dimension class and does not involve method chaining:

```
public Dimension getDimension( ) {
    Dimension d = new Dimension( );
    d.setX(1);
    d.setY(2);
    d.setZ(3);
    return d;
}
```

Embodiments of the present invention involve a recognition that it would be advantageous in some respects if source code such as source code GG could, instead, be written in a method chaining format such as the following ("source code HH"):

```
public Dimension getDimension2( ) {
    return new Dimension( ).setX(1).setY(2).setZ(3);
}
```

However, the compiler would return an error in the case of source code HH, due to the given Dimension Class source code. That is, it is recognized herein that even if the source code was available and it was possible to modify the source code to provide a method chaining syntax as in source code HH, nevertheless source code HH is impermissible due to the type of setter method provided by the Dimension Class source code, since the setter method does not return the Dimension object that received the method call and since this is also not a situation in which an object is returned by a first called method and then receives the next method call. However, embodiments of the present invention also recognize that method chaining can, nevertheless, be indirectly achieved by re-factoring compiled code, as disclosed herein, since this does not actually alter source code and, therefore, will not cause compiler errors. If the re-factoring is done properly, the modified byte-code will provide the same logical result as the original source code.

Stated in terms of the above example, a method chaining effect of impermissible source code HH may be accomplished as disclosed herein without producing and compiling source code HH. That is, software tool may transform the byte-code compiled from source code GG, such that the transformed byte-code returns the receiving object (this) or adds a method that calls the void method and returns the receiving object (this). The transformed byte-code is the same as would be produced by the Java compiler from the following, hypothetical source code ("source code II"):

```
        public Dimension setX1(int x) {
    this.x = x;
    return this;
}
        public Dimension setY1(int y) {
    this.y = y;
    return this;
}
        public Dimension setZ1(int z) {
    this.z = z;
    return this;
}
```

For hypothetical source code II to be permitted, the setter methods defined in Dimension Class source code would have to be of the types that return the receiving object (this). According to one or more embodiments of the present invention, in order to accomplish the method chaining effect of source code HH, but without producing source or attempting to compile source code HH, software tool transforms byte-code that Java compiler generates from source code GG.

To illustrate, consider the following byte-code ("byte-code GG"), which is generated by Java compiler for the line "public void setX(int x){this.x=x;}" of the Dimension Class source code that is called by the line "d.SetX(1)" in source code GG:

```
        public void setX(int x);
            0 aload_0 [this]
            1 iload_1 [x]
            2 putfield Dimension.x
            5 return
```

Software tool transforms this byte-code GG to the following byte-code ("byte-code II"), which performs the same function as would be compiled from "public Dimension setX1(int x){this.x=x; return this;}" in hypothetical source code II:

```
        public Dimension setX1(int x);
            0 aload_0 [this]
            1 iload_1 [x]
            2 putfield Dimension.x
            5 aload_0 [this]
            6 areturn
```

Software tool does this by adding to byte-code GG the one instruction shown in line 5 of byte-code II above and by modifying the method's signature, i.e., changing the method from a void Set ( ) method to a Dimension Set( ) method. Software tool does the same for Y and Z. Because of this transformation, software tool is then able to transform byte code produced by Java compiler for instances of the Dimension Class source code so that the byte code performs method chaining, even though method chaining is not permitted by the compiler for the setter method used by the Dimension Class source code.

Specifically, byte-code produced by the Java compiler for the entirety of source code GG is as follows ("entire byte-code GG"):

```
        public Dimension getDimension( );
            0 new Dimension
            3 dup
            4 invokespecial Dimension( )
            7 astore_1 [d]
            8 aload_1 [d]
            9 iconst_1
            10 invokevirtual Dimension.setX(int)
            13 aload_1 [d]
            14 iconst_2
            15 invokevirtual Dimension.setY(int)
            18 aload_1 [d]
            19 iconst_3
            20 invokevirtual Dimension.setZ(int)
            23 aload_1 [d]
            24 areturn
```

To enable method chaining in spite of the type of setter method defined by Dimension Class source code, optimizer software tool first transforms this entire byte-code by adding an instruction and changing the setter method for each of the variables X, Y and Z that are set by this code, as described herein above for variable X, which yields the following first transformed version of entire byte-code GG:

```
        public Dimension getDimension( );
            0 new Dimension
            3 dup
            4 invokespecial Dimension( )
            7 astore_1 [d]
            8 aload_1 [d]
            9 iconst_1
            10 invokevirtual Dimension.setX1(int)
            13 aload_1 [d]
            14 iconst_2
            15 invokevirtual Dimension.setY1(int)
            18 aload_1 [d]
            19 iconst_3
            20 invokevirtual Dimension.setZ1(int)
            23 aload_1 [d]
            24 areturn
```

To then provide method chaining, the optimizer software tool next removes lines 7, 8, 13, 18 and 23 from first transformed byte-code GG, yielding the following second transformed version of entire byte-code GG:

```
        public Dimension getDimension( );
            0 new Dimension
            3 dup
            4 invokespecial Dimension( )
            7 iconst_1
            8 invokevirtual Dimension.setX1(int)
            11 iconst_2
            12 invokevirtual Dimension.setY1(int)
            15 iconst_3
            16 invokevirtual Dimension.setZ1(int)
            19 areturn
```

Note that if tool determines it will not violate Reflection API method lookups to the original method by changing the return type of the original method's signature, then it will reuse original method names and in the above example it will designate method setX1 by its original name, setX, and likewise for setY1 and setZ1. Note also that in the first transformed version of entire byte-code GG herein above, certain byte-code instructions are added to transform methods so they are compatible with method chaining, whereas at least certain ones of those added byte-code instructions are then immediately deleted in the second transformed version of entire byte-code GG to achieve method chaining. In embodiments of the present invention, the software tool may perform both of the above described transformations of byte-code in one step, wherein tool recognizes those byte-code instructions that would be deleted once the instructions are added and, therefore, does not add them in the first place.

In the above example, byte-code is transformed to achieve the effect of wrapping an original method in source code with a new method, so that the wrapped method is compatible with method chaining and the transformed byte-code can provide the effect of chained instances of the wrapped method. That is, tool transforms original byte-code compiled from source code that included the original method, in order to provide transformed byte-code for chained instances of the wrapped method. If the code of the original method that is wrapped is more complex than in the above example, tool may alternatively transform the original byte-code such that the transformed byte-code provides the effect wherein the method that wraps the original method simply invokes the void method and then returns "this." That is, the transformed byte-code provides the effect of having been compiled from hypothetical source code as follows (source code JJ"):

```
public Dimension setX1(int x) {
this.setX(x);
return this;
}
    public Dimension setY1(int y) {
this.setY(y);
return this;
}
    public Dimension setZ1(int z) {
this.setZ(z);
return this;
}
```

This alternative embodiment is slightly slower (extra method invocation), but avoids code duplication.

In yet another embodiment of the present invention, according to the above example, tool transforms the byte code wherein the original method name is used but the void return in the method signature is modified to the Dimension type. The hypothetical source code ("source code II") would then be as follows: ("source code KK"):

```
public Dimension setX(int x) {
this.x = x;
return this;
}
    public Dimension setY(int y) {
this.y = y;
return this;
}
    public Dimension setZ(int z) {
this.z = z;
return this;
}
```

For a case such as illustrated above, wherein a method signature must be changed to accomplish method chaining, tool considers whether the savings achieved by method chaining outweighs using the unmodified setter methods alone and NOT applying method chaining. This includes weighing the effect of slower code in places where the method is used but method chaining cannot be employed versus the effect of faster, shorter code where method chaining can be employed. and more importantly if code looks up the method signature through the Reflection API. Also, tool takes into account Java versions that support the Reflection API, in which directly changing the method signature is not possible if the code includes a method lookup that refers to return type. Some Java platforms do not support Reflection, so the transformation processes described herein can be performed safely there. If tool determines this is the case, tool may first create duplicate setter methods: one void and one that returns this, as illustrated herein above.

To provide an idea of the potential savings that can be achieved in the ways described herein, consider for example that there are over 360,000 calls to the java.lang.StringBuffer constructors and methods in the Java classes of IBM Notes 8.5.3. About 160,000 of these calls may be optimized using method chaining, which would reduce the byte code by about 500 kb for the StringBuffer case alone.

Figure 1:
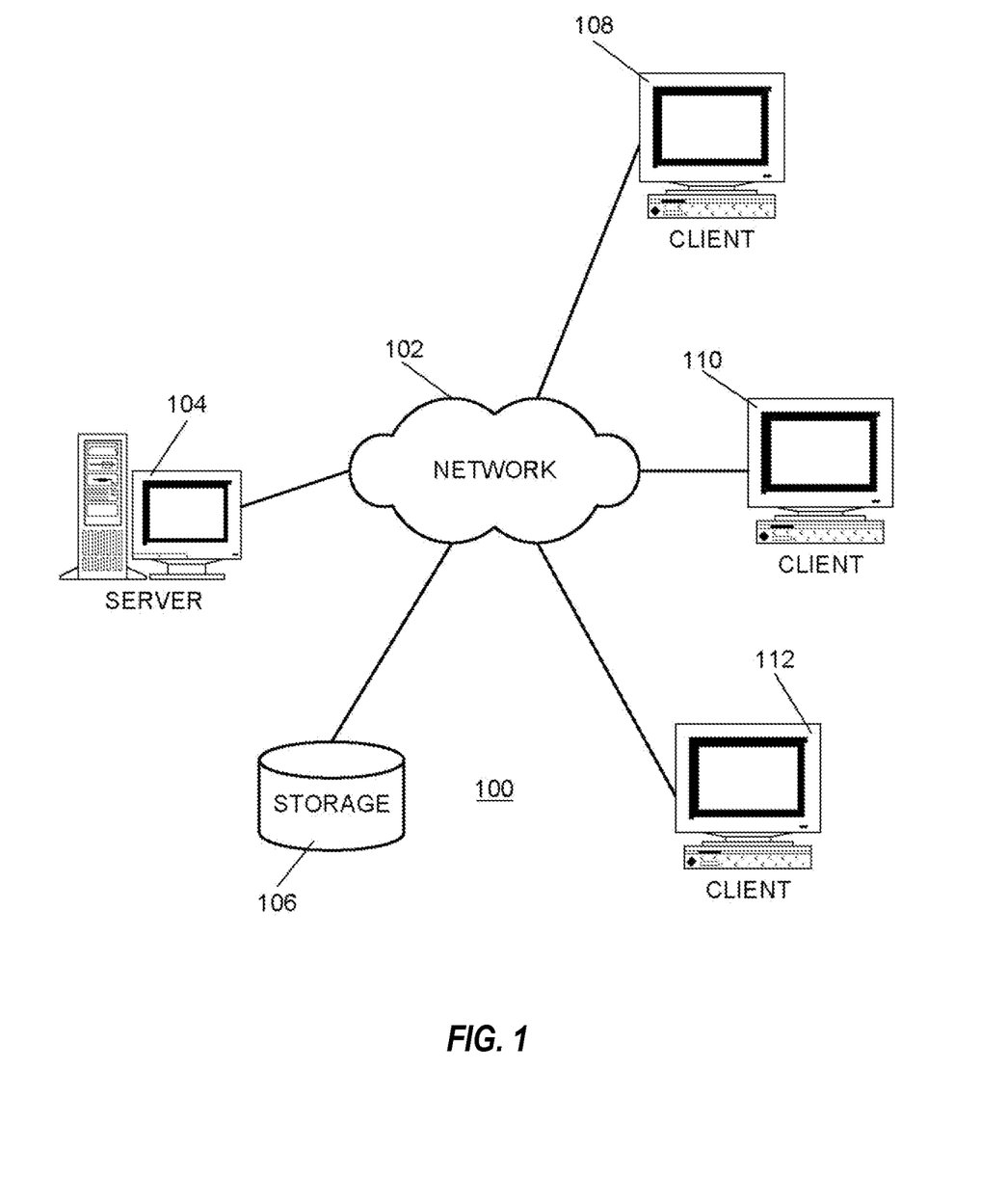
FIG. 1 is an exemplary block diagram illustrating a distributed data processing system according to embodiments of the invention.
Figure 2:
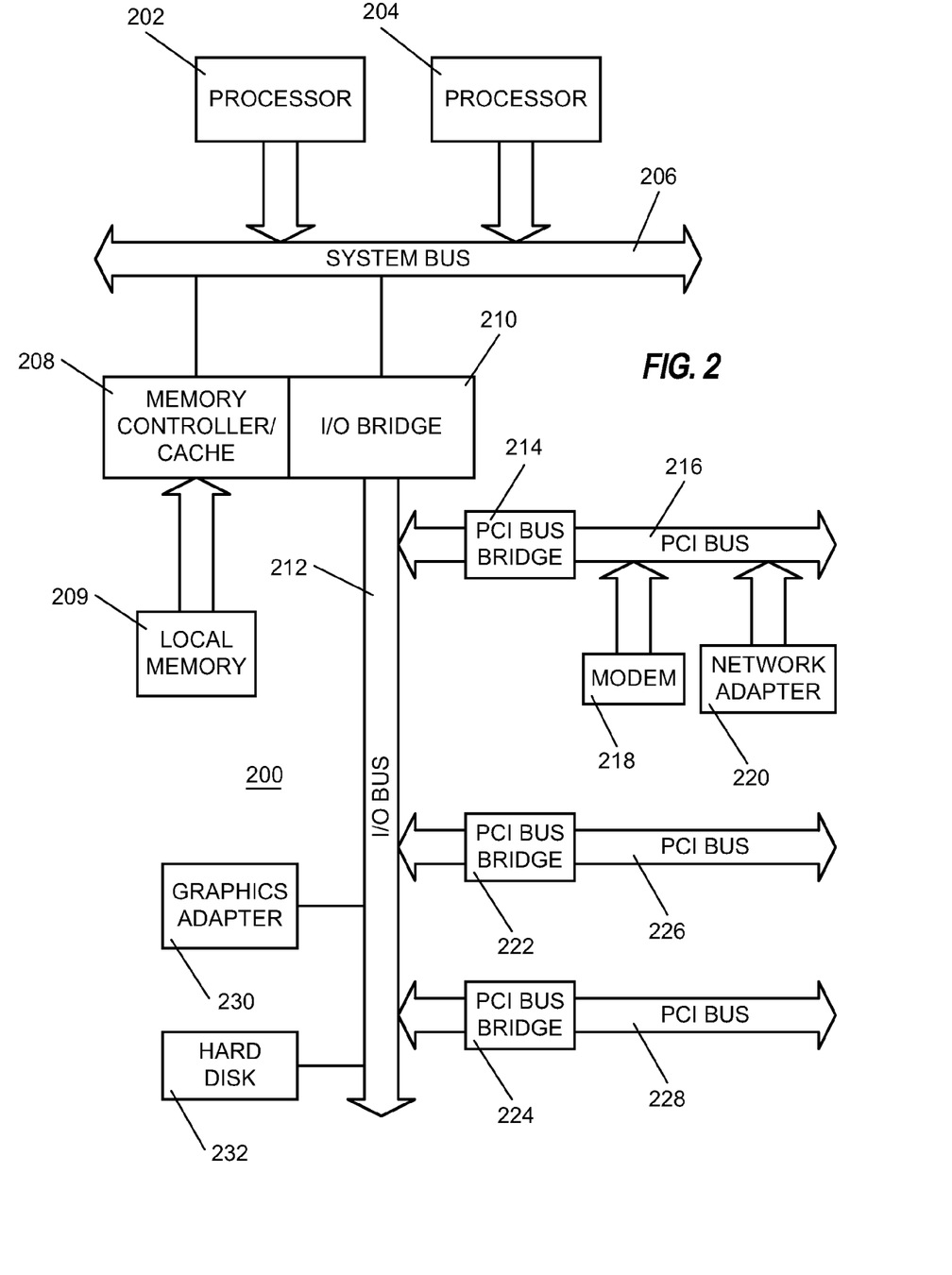
FIG. 2 is an exemplary block diagram of a server apparatus according to embodiments of the invention.
Figure 3:
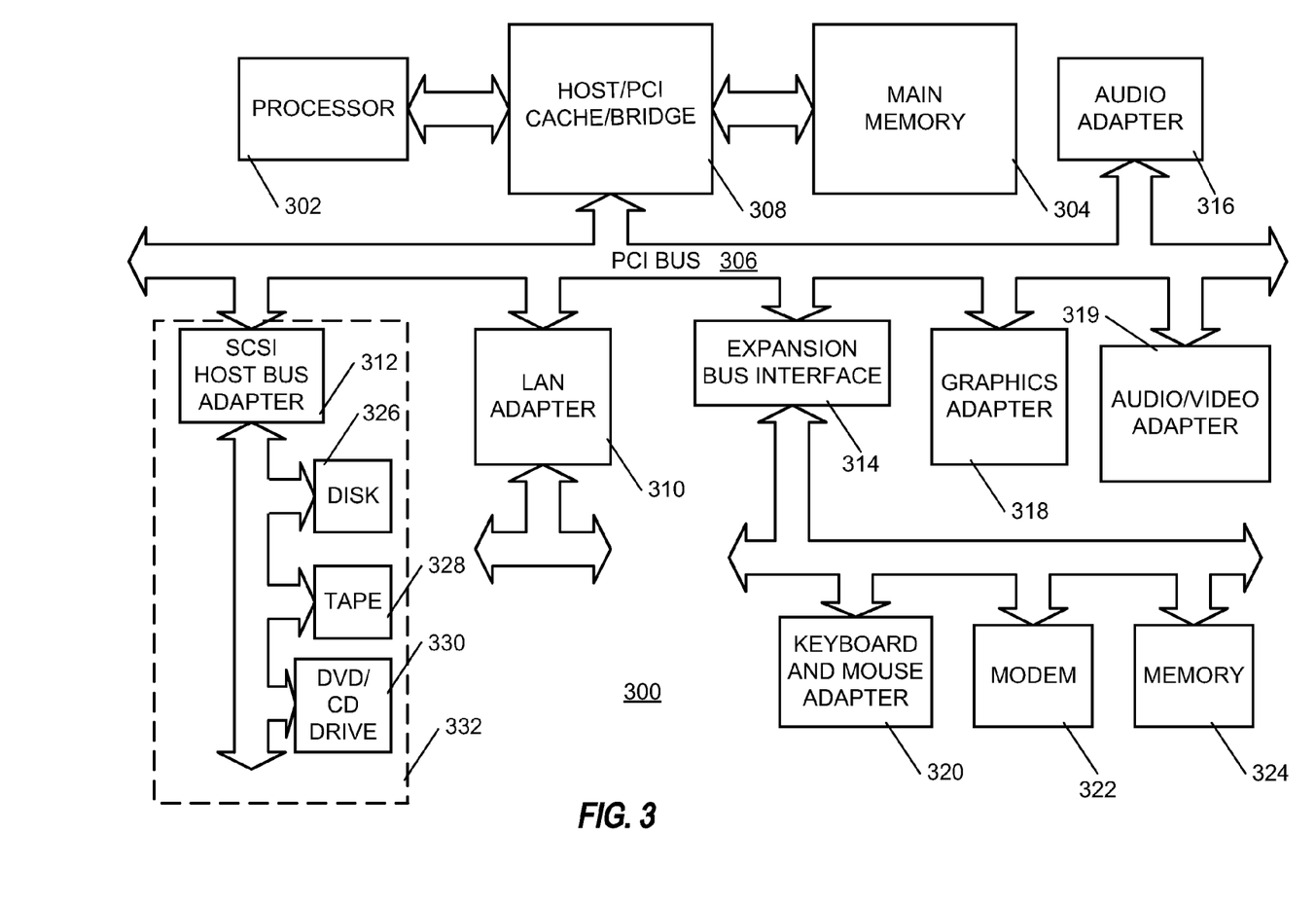
FIG. 3 is an exemplary block diagram of a client apparatus according to embodiments of the invention.

As previously noted, FIGS. 1-3 are, respectively, an exemplary block diagram illustrating a distributed data processing system, an exemplary block diagram of a server apparatus, and an exemplary block diagram of a client apparatus, all according to embodiments of the invention. Details of FIGS. 1-3 will be described herein below after the detailed description of FIGS. 4 and 5.

Figure 4:
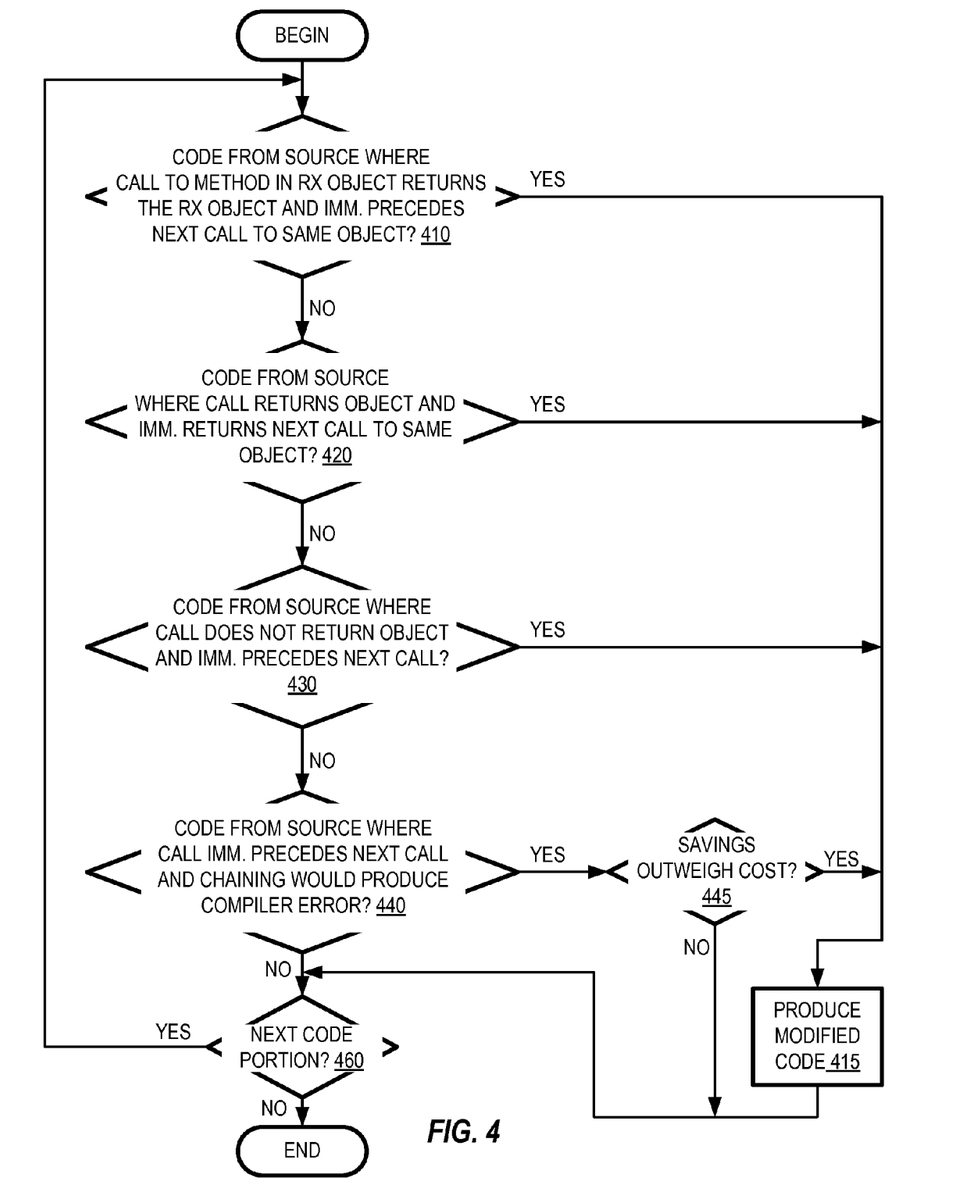
FIG. 4 illustrates a method for optimizing code compiled from source code, according to embodiments of the present invention.

Aspects of a process 400 for optimizing compiled code such as described herein above are graphically illustrated in the flowchart of FIG. 4, according to an embodiment of the invention. As indicated above, the method includes finding a portion of the compiled code arising from a portion of source code having method calls that were not chained method calls, which is done in a variety of ways.

In a first way that is shown at 410, finding the portion of the compiled code includes finding actual compiled code arising from a portion of the source code in which a first call to a first method in a receiving object returns the receiving object and immediately precedes a next call to the same object for a next method. This may be done by comparison of portions of actual byte-code to sample byte-code compiled from sample source code in which a first call to a first method in a receiving object returns the receiving object and immediately precedes a next call to the same object for a next method. Further, the sample byte-code may include one sample compiled from a source code portion in which the method calls are chained. and another sample compiled from a source code portion in which the method calls are not chained, as in the examples herein above.

If at 410, a portion of the compiled code is found that includes compiled code arising from a portion of the source code in which a first call to a first method in a receiving object returns the receiving object and immediately precedes a next call to the same object for a next method and in which the method calls are not chained, then process 410 branches to 415, where the process modifies the compiled code to conform to compiled code that would have arisen from source code having chained calls equivalent to the method calls that were not chained in the portion of the source code. Thereafter, process 415 continues to 460 and either continues searching the compiled code for more code to modify, if the test at 460 indicates there is more code to search, or else ends, if the test indicates there is not.

If at 410, a portion of the compiled code is not found that fits the indicated patter, then process 410 branches to 420, where the process searches the compiled code for a portion of the compiled code that includes code arising from a portion of the source code in which a first call to a first method returns an object and immediately precedes a next call to the same object for a next method, an in which the calls are not chained. Again, this pattern may be detected by comparison of portions of actual byte-code to samples of byte-code compiled from both chained method and unchained method sample source code, in similar fashion as described above regarding the pattern of 410 and as shown in example code herein further above.

If at 420, a portion of the compiled code is found that includes the indicated pattern, then process 420 branches to 415, where the process modifies the compiled code to conform to compiled code that would have arisen from source code having chained calls equivalent to the method calls of the indicated pattern. In general, this includes deleting one or more lines of the portion of the compiled code, as illustrated in the code examples herein above. Thereafter, process 415 continues to 460 and either continues searching the compiled code for more code to modify, if the test at 460 indicates there is more code to search, or else ends, if the test indicates there is not.

If at 420, a portion of the compiled code is not found that fits the indicated pattern, then process 420 branches to 430, where the process searches the compiled code for a portion of the compiled code that includes code arising from a portion of the source code in which a first call to a first method does not return an object and immediately precedes a next call to a next method and in which the calls are not chained. Again, this pattern may be detected by comparison of portions of actual byte-code to samples of byte-code compiled from both chained method and unchained method sample source code, in similar fashion as described above regarding the pattern of 410 and as shown in example code herein further above.

If at 430, a portion of the compiled code is found that includes the indicated pattern, then process 430 branches to 415, where the process modifies the compiled code to conform to compiled code that would have arisen from source code having chained calls equivalent to the method calls of the indicated pattern. Again, this generally includes deleting one or more lines of the portion of the compiled code, as illustrated in the code examples herein above. Thereafter, process 415 continues to 460 and either continues searching the compiled code for more code to modify, if the test at 460 indicates there is more code to search, or else ends, if the test indicates there is not.

If at 430, a portion of the compiled code is not found that fits the indicated pattern, then process 430 branches to 440, where the process searches the compiled code for a portion of the compiled code that includes code arising from the portion of the source code having a first call to a first method immediately preceding a next call to a next method that are unchained calls and for which chaining of the first and next method calls would produce compiler error due to the setter methods of the calls. Again, this pattern may be detected by comparison of portions of actual byte-code to samples of byte-code compiled from both chained method and unchained method sample source code, in similar fashion as described above regarding the pattern of 410 and as shown in example code herein further above.

If at 440, a portion of the compiled code is found that includes the indicated pattern, then process 440 branches to 445, where process 445 determines if the performance savings of modifying the compiled code exceeds potential performance cost, which is described herein above following example portions of code. If process 445 determines the savings exceeds the cost, then it branches to 415, where it modifies the compiled code to conform to code that would have arisen from source code having a setter method compatible with method chaining. In general, this includes deleting one or more lines of the portion of the compiled code, as illustrated in the code examples herein above. Thereafter, process 415 continues to 460 and either continues searching the compiled code for more code to modify, if the test at 460 indicates there is more code to search, or else ends, if the test indicates there is not.

Figure 5:
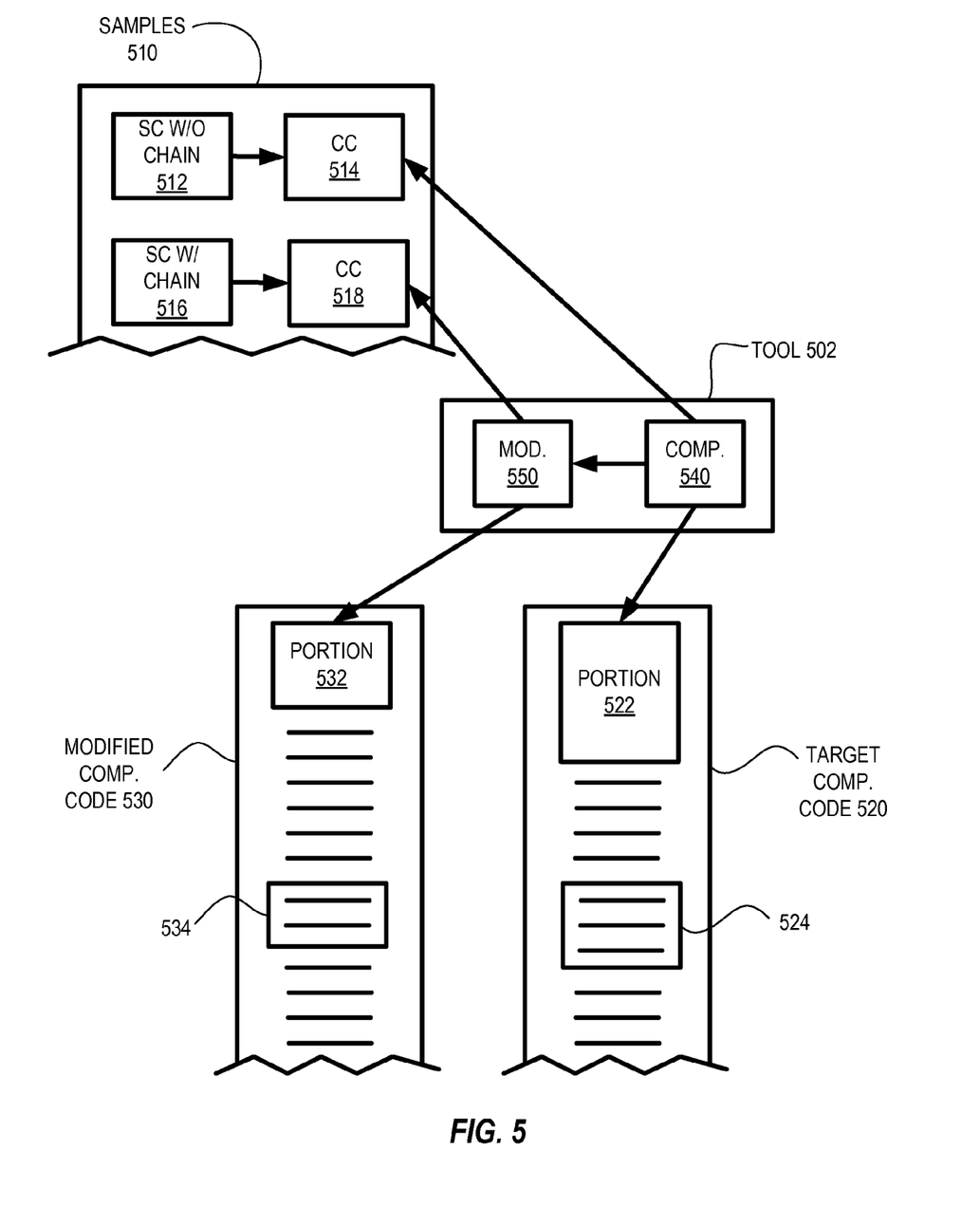
FIG. 5 is an exemplary block diagram illustrating aspects of data and software structure, according to embodiments of the present invention.

Referring now to FIG. 5, samples 510 of source code without method chaining 512 and equivalent source code 516 with method chaining are shown, along with compiled code 514 that is compiled from source code 512 and compiled code 518 that is compiled from source code 516, according to embodiments of the present invention. Sample code 510 may be provided to software tool 502 by a user in an initialization process. Although only one example is illustrated of source code without method chaining 512 and equivalent source code with method chaining 516, and their corresponding compiled code 514 and 518, it should be appreciated that samples 510 include additional sets of source code without method chaining and equivalent source code with method chaining, and their corresponding compiled code, as in the example portions of code provided in detail herein above.

Software tool 502 includes a comparison module 540 that scans through actual compiled code 520 of a target program looking for portions that match sample compiled code arising from source code without method chaining, such as the depicted example of target program compiled code 522 that matches compiled code 514 arising from source code 512. Software tool 502 also includes code modification module 550. In response to comparison module 540 finding a match, module 540 notifies module 550 to modify the portion of compiled code of the target program. That is, in the illustrated example, module 540 notifies module 550 that the portion 522 of compiled code 520 matches sample compiled code 514 that arises from sampled source code 512, which is without method chaining. In response, module 550 produces a corresponding portion of compiled code 532 for modified compiled code 530, where compiled code 532 is like that of sample compiled code 518 arising from source code 516, which is equivalent to source code 512, but includes method chaining.

Also depicted in FIG. 5 is another portion 524 of the target program compiled code 520. This illustrates that after finding a first portion 522 and modifying it to produce modified portion 532, software tool 502 continues scanning through remaining compiled code 520, with module 540 looking for additional portions that match sample compiled code arising from source code without method chaining. In the example depicted, software tool 502 module 540 finds an additional portion 524, from which module 550 generates modified compiled code portion 534.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system such as Java may run in conjunction with the operating system and provide calls to the operating system from Java programs or applications executing on data processing system 300. (Java and all Java-based trademarks and logos are trademarks or registered trademarks of Oracle and/or its affiliates.) Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and Web-Sphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

The flowchart and block diagrams in the Figures illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that, although the invention is shown to be used in conjunction with a conventional computer system (i.e., clients 108, 110, 112 and server 104), the invention can easily be used by any handheld device (e.g., cellular telephone, PDA etc.).

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing compiled code comprising:
   finding a portion of the compiled code arising from method calls in a portion of source code that were not chained method calls; and
   producing modified code for the portion of the compiled code, wherein the modified code conforms to compiled code that would have arisen from source code having one method call immediately preceding another method call in a method chaining syntax equivalent to the method calls that existed in the found portion of the source code and were not chained in the portion of the source code.

2. The method of claim 1, wherein finding the portion of the compiled code comprises:
   finding compiled code arising from the portion of the source code in which a first call to a first method in a receiving object returns the receiving object and immediately precedes a next call to the same object for a next method.

3. The method of claim 1, wherein finding the portion of the compiled code comprises:
   finding compiled code arising from the portion of the source code in which a first call to a first method returns an object and immediately precedes a next call to the same object for a next method.

4. The method of claim 1, wherein finding the portion of the compiled code comprises:

finding compiled code arising from the portion of the source code in which a first call to a first method does not return an object and immediately precedes a next call to a next method.

5. The method of claim 1, wherein finding the portion of the compiled code comprises:
finding compiled code arising from the portion of the source code having a first call to a first method immediately preceding a next call to a next method and for which chaining of the first and next method calls would produce compiler error; and
wherein producing modified code for the portion of the compiled code comprises:
producing modified code conforming to compiled code that would have arisen from source code having a different setter method than would compile to produce the modified code for the first call and next call.

6. The method of claim 5, wherein producing modified code for the portion of the compiled code comprises:
producing modified code for the portion of the compiled code responsive to determining that performance savings achieved by the method chaining via the different setter method outweighs performance cost of where method chaining cannot be applied in spite of the different setter method.

7. The method of claim 1, wherein producing modified code for the portion of the compiled code comprises:
deleting lines of the portion of the compiled code.

8. A computer program product for optimizing compiled code, the computer program product including a non-transitory computer readable storage medium having instructions stored thereon for execution by a computer system, wherein the instructions, when executed by the computer system, cause the computer system to implement a method comprising:
finding a portion of the compiled code arising from method calls in a portion of source code that were not chained method calls; and
producing modified code for the portion of the compiled code, wherein the modified code conforms to compiled code that would have arisen from source code having one method call immediately preceding another method call in a method chaining syntax equivalent to the method calls that existed in the found portion of the source code and were not chained in the portion of the source code.

9. The computer program product of claim 8, wherein finding the portion of the compiled code comprises:
finding compiled code arising from the portion of the source code in which a first call to a first method in a receiving object returns the receiving object and immediately precedes a next call to the same object for a next method.

10. The computer program product of claim 8, wherein finding the portion of the compiled code comprises:
finding compiled code arising from the portion of the source code in which a first call to a first method returns an object and immediately precedes a next call to the same object for a next method.

11. The computer program product of claim 8, wherein finding the portion of the compiled code comprises:
finding compiled code arising from the portion of the source code in which a first call to a first method does not return an object and immediately precedes a next call to a next method.

12. The computer program product of claim 8, wherein finding the portion of the compiled code comprises:
finding compiled code arising from the portion of the source code having a first call to a first method immediately preceding a next call to a next method and for which chaining of the first and next method calls would produce compiler error; and
wherein producing modified code for the portion of the compiled code comprises:
producing modified code conforming to compiled code that would have arisen from source code having a different setter method than would compile to produce the modified code for the first call and next call.

13. The computer program product of claim 12, wherein producing modified code for the portion of the compiled code comprises:
producing modified code for the portion of the compiled code responsive to determining that performance savings achieved by the method chaining via the different setter method outweighs performance cost of where method chaining cannot be applied in spite of the different setter method.

14. The computer program product of claim 8, wherein producing modified code for the portion of the compiled code comprises:
deleting lines of the portion of the compiled code.

15. A system for optimizing compiled code comprising:
a processor; and
a computer readable storage medium connected to the processor, wherein the computer readable storage medium has stored thereon a program for controlling the processor, and wherein the processor is operative with the program to execute the program for:
finding a portion of the compiled code arising from method calls in a portion of source code that were not chained method calls; and
producing modified code for the portion of the compiled code, wherein the modified code conforms to compiled code that would have arisen from source code having one method call immediately preceding another method call in a method chaining syntax equivalent to the method calls that existed in the found portion of the source code and were not chained in the portion of the source code.

16. The system of claim 15, wherein the finding the portion of the compiled code comprises:
finding compiled code arising from the portion of the source code in which a first call to a first method in a receiving object returns the receiving object and immediately precedes a next call to the same object for a next method.

17. The system of claim 15, wherein finding the portion of the compiled code comprises:
finding compiled code arising from the portion of the source code in which a first call to a first method returns an object and immediately precedes a next call to the same object for a next method.

18. The system of claim 15, wherein finding the portion of the compiled code comprises:
finding compiled code arising from the portion of the source code in which a first call to a first method does not return an object and immediately precedes a next call to a next method.

19. The system of claim 15, wherein finding the portion of the compiled code comprises:
finding compiled code arising from the portion of the source code having a first call to a first method immediately preceding a next call to a next method and for which chaining of the first and next method calls would produce compiler error; and wherein producing modified code for the portion of the compiled code comprises:

producing modified code conforming to compiled code that would have arisen from source code having a different setter method than would compile to produce the modified code for the first call and next call.

20. The system of claim 19, wherein producing modified code for the portion of the compiled code comprises:

producing modified code for the portion of the compiled code responsive to determining that performance savings achieved by the method chaining via the different setter method outweighs performance cost of where method chaining cannot be applied in spite of the different setter method.

* * * * *